(12) United States Patent
Olson et al.

(10) Patent No.: US 9,296,918 B2
(45) Date of Patent: Mar. 29, 2016

(54) OLEOPHOBIC COATINGS

(71) Applicant: 3M INNOVATIVE PROPERTIES COMPANY, St. Paul, MN (US)

(72) Inventors: Erik D. Olson, Shakopee, MN (US); Richard M. Flynn, Mahtomedi, MN (US); Daniel R. Vitcak, Cottage Grove, MN (US); Karl J. Manske, Roseville, MN (US); Kevin J. Bechtold, St. Paul, MN (US); Lian S. Tan, Woodbury, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 0 days.

(21) Appl. No.: 14/379,313

(22) PCT Filed: Feb. 6, 2013

(86) PCT No.: PCT/US2013/024807
§ 371 (c)(1),
(2) Date: Aug. 18, 2014

(87) PCT Pub. No.: WO2013/126208
PCT Pub. Date: Aug. 29, 2013

(65) Prior Publication Data
US 2015/0038642 A1 Feb. 5, 2015

Related U.S. Application Data

(60) Provisional application No. 61/600,847, filed on Feb. 20, 2012.

(51) Int. Cl.
| C08G 77/24 | (2006.01) |
| C09D 171/00 | (2006.01) |
| C03C 17/32 | (2006.01) |
| C09D 7/12 | (2006.01) |
| C09D 183/12 | (2006.01) |
| C09D 183/08 | (2006.01) |
| C08G 77/46 | (2006.01) |

(52) U.S. Cl.
CPC .............. *C09D 171/00* (2013.01); *C03C 17/32* (2013.01); *C09D 7/12* (2013.01); *C09D 183/08* (2013.01); *C09D 183/12* (2013.01); *C08G 77/24* (2013.01); *C08G 77/46* (2013.01)

(58) Field of Classification Search
CPC ..................................................... C09D 171/00
See application file for complete search history.

(56) References Cited

U.S. PATENT DOCUMENTS

| 3,250,808 | A |  | 5/1966 | Moore |
| 3,646,085 | A |  | 2/1972 | Bartlett |
| 3,950,588 | A |  | 4/1976 | McDougal |
| 6,200,884 | B1 |  | 3/2001 | Yang |
| 7,294,731 | B1 | * | 11/2007 | Flynn et al. .................. 556/427 |
| 7,745,653 | B2 |  | 6/2010 | Iyer |
| 2006/0014895 | A1 |  | 1/2006 | Shiono |
| 2008/0071042 | A1 |  | 3/2008 | Yamane |
| 2009/0208728 | A1 |  | 8/2009 | Itami |
| 2011/0045270 | A1 |  | 2/2011 | Dams |
| 2011/0081496 | A1 |  | 4/2011 | Iyer |

FOREIGN PATENT DOCUMENTS

| EP | 0789050 | 8/1997 |
| EP | 2070967 | 6/2009 |
| WO | 99-37720 | 7/1999 |
| WO | 2013/074299 | 5/2013 |

OTHER PUBLICATIONS

Kostjuk, "Anionic Ring-Opening Polymerization of Hexafluoropropylene Oxide Using Alkali Metal Fluorides as Catalysts: a Mechanistic Study", Macromolecules, 2009, vol. 42, No. 3, pp. 612-619.
"Application of easy clean coating materials to ophthalmic Lenses", IP.com Number: IPCOM000228121D, Jun. 6, 2013, 2 pages.
International Search Report for PCT Application No. PCT/US2013/024807 mailed May 15, 2013, 3 pages.
ASTM D1894-08, "Standard Test Method for Static and Kinetic Coefficients of Friction of Plastic Film and Sheeting", 6 pages.
Supplementary EP Search Report EP 13751261, dated Aug. 27, 2015 (6 pages).

* cited by examiner

*Primary Examiner* — Kuo-Liang Peng
(74) *Attorney, Agent, or Firm* — Adam Bramwell

(57) ABSTRACT

A polymeric coating for a glass substrate includes a hexafluoropropylene oxide derived silane polymer. The hexafluoropropylene oxide derived silane polymer has a molecular weight of greater than about 5500, a thickness of between about 2 and about 15 nanometers and a coefficient of friction constant of less than about 0.35. A water contact angle of the polymeric hexafluoropropylene oxide derived silane coating decreases by less than about 27% after being subjected to 10000 abrasion cycles.

8 Claims, No Drawings

OLEOPHOBIC COATINGS

CROSS REFERENCE TO RELATED APPLICATIONS

This application is a national stage filing under 35 U.S.C. 371 of PCT/US2013/024807, filed Feb. 6, 2013, which claims priority to U.S. Provisional Application No. 61/600,847, filed Feb. 20, 2012, the disclosure of which is incorporated by reference in its/their entirety herein.

FIELD OF THE INVENTION

The present invention is related generally to the field of oleophobic coatings. In particular, the present invention is a hexafluoropropylene oxide derived silane coating having a reduced coefficient of friction and increased abrasion resistance with increasing molecular weight.

BACKGROUND

Various compositions of fluorochemical materials have been applied to surfaces to impart low surface energy characteristics such as oil and/or water repellency (oleophobicity and/or hydrophobicity). Some of these fluorochemical materials are fluorinated silanes. The use of fluorinated silanes, i.e., silane compounds that have one or more fluorinated groups for rendering substrates such as glass and ceramics oil and water repellent are known. Various fluorinated silanes are described, for example, in U.S. Pat. No. 7,294,731 B1 (Flynn et al.), U.S. Patent Application Publication No. 2006/0014895 (Shiono), U.S. Patent Application Publication No. 2009/0208728 (Itami et al.), and U.S. Pat. No. 3,250,808 (Moore et al.).

Additionally, U.S. Pat. No. 6,200,884 discloses compositions of perfluoropolyether-modified aminosilanes that cure into films having improved water and oil repellency and anti-stain properties. EP 789050 discloses the use of fluorinated polyether silanes for making composite film coatings. U.S. Pat. No. 3,646,085 teaches fluorinated polyether silanes for rendering glass or metal surfaces oil and water repellent. WO 99/37720 discloses fluorinated polyether silanes for providing antisoiling coating to antireflective surfaces on substrates such as glass or plastic. U.S. Pat. No. 3,950,588 discloses the use of fluorinated polyether silanes to render ceramic surfaces such as bathroom tiles or cookware water and/or oil repellent.

SUMMARY

In one embodiment, the present invention is a polymeric coating for a glass substrate. The polymeric coating includes a hexafluoropropylene oxide derived silane polymer. The hexafluoropropylene oxide derived silane polymer has a molecular weight of greater than about 5500, a thickness of about 2 to about 15 nanometers and a coefficient of friction constant of less than about 0.35. A water contact angle of the polymeric hexafluoropropylene oxide derived silane coating decreases by less than about 27% after being subjected to 10000 abrasion cycles.

DETAILED DESCRIPTION

Coating compositions are provided that include a hexafluoropropylene oxide derived silane polymer having a number average molecular weight of about 5500 grams per mole or greater. The coating compositions can be applied to a siliceous substrate to form an article. The polymeric hexafluoropropylene oxide derived silane has a silyl group that can react with a surface of the siliceous substrate forming a —Si—O—Si— bond. The resulting article can be used to provide a surface with abrasion resistance, easy to clean characteristics, good tactile response (i.e., a finger can easily slide over the surface), or a combination thereof. A surprising relationship has been found between the molecular weight of the coating composition and abrasion resistance. Additionally, it was surprisingly found that, by modification of the molecular weight of the coating composition, the coefficient of friction can be modified and improved. As the molecular weight of the coating composition increases, the abrasion resistance increases. With increasing molecular weight of the coating, the coefficient of friction decreases, resulting in an improved coefficient of friction.

The recitation of any numerical range by endpoints is meant to include the endpoints of the range, all numbers within the range, and any narrower range within the stated range.

The term "a", "an", and "the" are used interchangeably with "at least one" to mean one or more of the elements being described.

The term "and/or" means either or both. For example, the expression "A and/or B" means A, B, or a combination of A and B.

The term "fluorinated" refers to a group or compound that contains at least one fluorine atom attached to a carbon atom.

The term "perfluorinated" refers to a group or compound having all C—H bonds replaced with C—F bonds. Examples include perfluoropolyether groups or compounds, perfluoroether groups or compounds, and perfluoroalkane groups or compounds. Perfluorinated groups or compounds are a subset of fluorinated groups or compounds.

The term "ether" refers to a group or compound having an oxy group between two carbon atoms. Ether groups are often divalent groups such as —$CH_2$—O—$CH_2$— or —$CF_2$—O—$CF_2$—.

The term "polyether" refers to a group or compound having multiple ether groups.

The term "thioether" refers to a group or compound having a thio group between two carbon atoms. Thioether groups are the divalent group —$CH_2$—S—$CH_2$—.

The term "hexafluoropropylene oxide derived silane" refers to a polymer of hexafluoropropylene oxide which has been functionalized with a silane functional group.

The coating compositions include a hexafluoropropylene oxide derived silane polymer having a number average molecular weight of about 5500 grams/mole or greater, particularly about 9000 grams/mole or greater and more particularly about 20000 grams/mole or greater. At number average molecular weights of less than 5500 grams/mol, the polymeric coating does not display effective abrasion resistance and has a higher coefficient of friction. The number average molecular weight of the hexafluoropropylene oxide derived silane polymer may be a single molecular weight or a combination of molecular weights. For example, the hexafluoropropylene oxide derived silane polymer may be a blend of one or more higher molecular weight materials provided that the number average molecular weight of the blended hexafluoropropylene oxide derived silane polymer is about 5500 grams/mole or greater. Examples of suitable polymeric hexafluoropropylene oxide derived silanes include, but are not limited to, hexafluoropropylene oxide derived thioether silanes and hexafluoropropylene oxide derived ether silanes having a molecular weight of about 5500 or greater.

Water and hexadecane contact angles provide an indication of the durability of the polymeric hexafluoropropylene oxide derived silane coatings. As the polymeric coating is abraded and the underlying substrate is exposed, both the hexadecane and water contact angles decrease from their values measured on the initial coated substrate. The contact angle of the polymeric hexafluoropropylene oxide derived silane coating should preferably remain substantially the same through a number of abrasion cycles. In one embodiment, after 10000 abrasion cycles, the water contact angle of the polymeric hexafluoropropylene oxide derived silane coating decreased from its initial contact angle by less than about 27%, particularly less than about 25%, and more particularly less than about 22%.

In one embodiment, after 10000 abrasion cycles, the hexadecane contact angle of the polymeric hexafluoropropylene oxide derived silane coating decreased from its initial contact angle by less than about 8%, particularly less than about 6%, and more particularly less than about 4%.

In one embodiment, the polymeric hexafluoropropylene oxide derived silane coating applied onto a piece of float glass has a coefficient of friction constant of less than about 0.35 particularly less than about 0.32 and more particularly less than about 0.30.

Very thin coatings of one nanometer or less do not have sufficient abrasion durability and conversely coatings thicker than about 1000 nanometers have very poor abrasion durability. In one embodiment, the polymeric hexafluoropropylene oxide derived silane coating has a thickness of between about 2 and about 15 nanometers particularly between about 2 and about 10 nanometers and more particularly between about 4 and about 10 nanometers.

The polymeric hexafluoropropylene oxide derived silane coating includes a fluorinated silane of Formula (I).

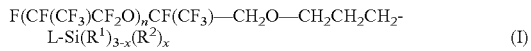

$$F(CF(CF_3)CF_2O)_nCF(CF_3)\text{—}CH_2O\text{—}CH_2CH_2CH_2\text{-}L\text{-}Si(R^1)_{3-x}(R^2)_x \quad (I)$$

In Formula (I), L is a single bond or $-S-CH_2CH_2CH_2-$. Group $R^1$ is hydroxy or a hydrolyzable group. Group $R^2$ is a non-hydrolyzable group. The variable x is equal to 0, 1, or 2. The variable n is an integer in a range of about 4 to about 150, in a range of about 5 to about 150, in a range of about 10 to about 150, in a range of about 10 to about 120, in a range of about 10 to about 100, in a range of about 10 to about 60, in a range of about 10 to about 40, in a range of about 20 to about 150, in a range of about 40 to about 150, in a range of about 50 to about 150, or in a range of about 60 to about 150.

In some fluorinated silanes, the group L is a single bond and the fluorinated silane of Formula (I) is of Formula (IA).

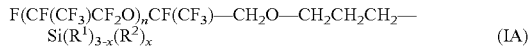

$$F(CF(CF_3)CF_2O)_nCF(CF_3)\text{—}CH_2O\text{—}CH_2CH_2CH_2\text{—}Si(R^1)_{3-x}(R^2)_x \quad (IA)$$

In other fluorinated silanes, the group L is $-S-CH_2CH_2CH_2-$ and the fluorinated silane of Formula (I) is of Formula (IB).

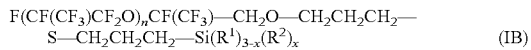

$$F(CF(CF_3)CF_2O)_nCF(CF_3)\text{—}CH_2O\text{—}CH_2CH_2CH_2\text{—}S\text{—}CH_2CH_2CH_2\text{—}Si(R^1)_{3-x}(R^2)_x \quad (IB)$$

The fluorinated silane has a perfluoropolyether group of formula $F(CF(CF_3)CF_2O)_nCF(CF_3)-$. The perfluoropolyether group has multiple branched hexafluoropropylene oxide $-(CF(CF_3)CF_2O)-$ groups. The number average molecular weight of the perfluoropolyether group of the fluorinated silane is at least about 5500 grams/mole, at least about 8000 grams/mole, at least about 12000 grams/mole, or at least about 20000 grams/mole. In some embodiments, higher number average molecular weights can further enhance durability. Generally, for ease of use and application, the number average molecular weight of the perfluoropolyether group is often up to about 20,000 grams/mole, up to about 12,000 grams/mole, up to about 10,000 grams/mole, up to about 7,500 grams/mole, up to about 6000 grams/mole or up to about 5500 grams/mole. In some embodiments, the number average molecular weight of the perfluoropolyether group is in a range of about 5500 to about 20,000 grams/mole, in a range of about 5500 to about 15,000 grams/mole, in a range of about 5500 to about 10000 grams/mole.

The fluorinated silane of Formula (I) has a silyl group $-Si(R^1)_{3-x}(R^2)_x$ where each $R^1$ group is selected from a hydroxyl or a hydrolyzable group and each $R^2$ group is selected from a non-hydrolyzable group. There is at least one $R^1$ group. That is, there can be one $R^1$ group and two $R^2$ groups, two $R^1$ groups and one $R^2$ group, or three $R^1$ groups and no $R^2$ group. When there are multiple $R^1$ groups, they can be the same or different. Likewise, when there are multiple $R^2$ groups, they can be the same or different. In many embodiments, there are three identical $R^1$ groups.

The term "hydrolyzable group" refers to a group that can react with water having a pH of 1 to 10 under conditions of atmospheric pressure. The hydrolyzable group is usually converted to a hydroxyl group when it reacts. The hydroxyl group often undergoes further reactions such as with a siliceous substrate. Typical hydrolyzable groups include alkoxy, aryloxy, aralkyloxy, acyloxy, and halo groups.

Suitable alkoxy $R^1$ groups include, but are not limited to, those of formula $-OR^a$ where $R^a$ is an alkyl group having 1 to 10 carbon atoms, 1 to 6 carbon atoms, 1 to 4 carbon atoms, 1 to 3 carbon atoms, or 1 to 2 carbon atoms. The alkyl portion of the alkoxy group can be linear, branched, cyclic, or a combination thereof. In many embodiments of Formula (I), each $R^1$ group is an alkoxy having 1 to 4 carbon atoms or 1 to 3 carbon atoms.

Suitable aryloxy $R^1$ groups include, but are not limited to, those of formula $-OAr$ where Ar is an aryl group. The aryl group is monovalent group having at least one carbocyclic aromatic ring. Additional carbocyclic rings can be fused to the aromatic ring. Any additional rings can be unsaturated, partially saturated, or saturated. The aryl portion of the aryloxy group often has 6 to 12 carbon atoms or 6 to 10 carbon atoms. In many embodiments, the aryloxy group is phenoxy.

Suitable aralkyloxy R' groups include, but are not limited to, those of formula $-OR^b-Ar$. The group $R^b$ is a divalent alkylene group (i.e., divalent radical of an alkane), having 1 to 10 carbon atoms, 1 to 6 carbon atoms, or 1 to 4 carbon atoms. The alkylene can be linear, branched, cyclic, or a combination thereof. The group Ar is an aryl group having at least one carbocyclic aromatic ring. Additional carbocyclic rings can be fused to the aromatic ring. Any additional rings can be unsaturated, partially saturated, or saturated. The aryl group often has 6 to 12 carbon atoms or 6 to 10 carbon atoms. The aryl group is often phenyl.

Suitable acyloxy $R^1$ groups include, but are not limited to, those of formula $-O(CO)R^c$ where $R^c$ is alkyl, aryl, or aralkyl. The group (CO) denotes a carbonyl group. Suitable alkyl $R^c$ groups often have 1 to 10 carbon atoms, 1 to 6 carbon atoms, or 1 to 4 carbon atoms. The alkyl can be linear, branched, cyclic, or a combination thereof. Suitable aryl $R^c$ groups are carbocyclic and have at least one aromatic ring. Additional carbocyclic rings can be fused to the aromatic ring. Any additional rings can be unsaturated, partially saturated, or saturated. The aryl group usually has 6 to 12 carbon atoms or 6 to 10 carbon atoms. The aryl group is often phenyl. Suitable aralkyl $R^c$ groups often have an alkylene group with 1 to 10 carbon atoms, 1 to 6 carbon atoms, or 1 to 4 carbon atoms and an aryl group with 6 to 12 carbon atoms, or 6 to 10 carbon atoms. The alkylene portion of the aralkyl group can be linear, branched, cyclic, or a combination thereof. The aryl portion of the aralkyl group has at least one carbocyclic aromatic ring. Additional carbocyclic rings can be fused to the aromatic ring. Any additional rings can be unsaturated, partially saturated, or saturated. The aryl group often has 6 to 12 carbon atoms or 6 to 10 carbon atoms. The aryl portion of the aralkyl group is often phenyl.

Suitable halo $R^1$ groups include, but are not limited to: be bromo, iodo, or chloro groups. The halo is often chloro.

Each $R^2$ group in Formulas (I) is a non-hydrolyzable group. The term "non-hydrolyzable group" refers to a group that does not react with water having a pH of 1 to 10 under conditions of atmospheric pressure. In many embodiments, the non-hydrolyzable group is an alkyl, aryl, or aralkyl group. Suitable alkyl $R^2$ groups include those having 1 to 10 carbon atoms, 1 to 6 carbon atoms, or 1 to 4 carbon atoms. The alkyl can be linear, branched, cyclic, or a combination thereof. Suitable aryl $R^2$ groups are carbocyclic and have at least one aromatic ring. Additional carbocyclic rings can be fused to the aromatic ring. Any additional rings can be unsaturated, partially saturated, or saturated. The aryl group often has 6 to 12 carbon atoms or 6 to 10 carbon atoms. The aryl group is often phenyl. Suitable aralkyl $R^2$ groups often have an alkylene group having 1 to 10 carbon atoms, 1 to 6 carbon atoms, or 1 to 4 carbon atoms and an aryl group with 6 to 12 carbon atoms, or 6 to 10 carbon atoms. The alkylene portion of the aralkyl group can be linear, branched, cyclic, or a combination thereof. The aryl portion of the aralkyl group has at least one carbocyclic aromatic ring. Additional carbocyclic rings can be fused to the aromatic ring. Any additional rings can be unsaturated, partially saturated, or saturated. The aryl group often has 6 to 12 carbon atoms or 6 to 10 carbon atoms. The aryl portion of the aralkyl group is often phenyl.

Methods of preparing the compounds of Formulas (IA) are known. These fluorinated silanes can be prepared by initially preparing a fluorinated methyl ester of Formula (II) where n is the same as defined for Formula (I).

$$F(CF(CF_3)CF_2O)_nCF(CF_3)\text{---}(CO)OCH_3 \quad (II)$$

This fluorinated methyl ester of Formula (II) can be prepared by several methods. In a first method, the fluorinated methyl ester is prepared by metal fluoride-initiated oligomerization of hexafluoropropylene oxide in diglyme (i.e. bis(2-methoxyethyl)ether) solvent according to the method described in U.S. Pat. No. 3,250,808 (Moore et al.), the description of which is incorporated herein by reference. The fluorinated methyl ester can be purified by distillation to remove low-boiling components. Other solvents can also be used in addition to those described in Moore et al. including hexafluoropropene, 1,1,1,3,3-pentafluorobutane and 1,3-bis(trifluoromethyl)benzene as described by S. V. Kostjuk et al. in *Macromolecules*, 42, 612-619 (2009).

Alternatively, the fluorinated methyl ester of Formula (II) can also be prepared from the corresponding fluorinated carboxylic acid of Formula (III).

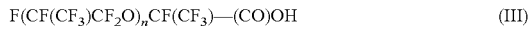
$$F(CF(CF_3)CF_2O)_nCF(CF_3)\text{---}(CO)OH \quad (III)$$

Suitable fluorinated carboxylic acids are commercially available under the trade designation KRYTOX (e.g., KYTOX 157FS(H)). The fluorinated carboxylic acid can be reacted with a chlorinating agent such as thionyl chloride or oxalyl chloride to form the corresponding fluorinated carboxylic acid chloride. The fluorinated carboxylic acid chloride can be subsequently reacted with methanol to form the fluorinated methyl ester of Formula (II).

The fluorinated methyl ester of Formula (II) can then be reduced with sodium borohydride to a fluorinated alcohol of Formula (IV).

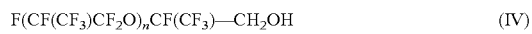
$$F(CF(CF_3)CF_2O)_nCF(CF_3)\text{---}CH_2OH \quad (IV)$$

The fluorinated alcohol of Formula (IV) can be reacted with allyl bromide to form the fluorinated allyl ether of Formula (V).

$$F(CF(CF_3)CF_2O)_nCF(CF_3)\text{---}CH_2OCH_2CH\text{=}CH_2 \quad (V)$$

The fluorinated allyl ether of Formula (V) can then be reacted with trichlorosilane to form a fluorinated silane with a trichlorosilyl group. The trichlorosilyl group can be reacted with an alcohol such as methanol to form a trialkoxysilyl group (e.g., a trimethoxysilyl group as in Formula (VI)).

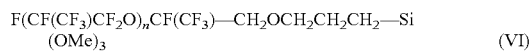
$$F(CF(CF_3)CF_2O)_nCF(CF_3)\text{---}CH_2OCH_2CH_2CH_2\text{---}Si(OMe)_3 \quad (VI)$$

Methods of preparing the compounds of Formula (IB) are known. These fluorinated silanes can be prepared, for example, as described in U.S. Pat. No. 7,294,731 B1 (Flynn et al.). More specifically, the fluorinated allyl ether of Formula (V) above can be reacted with a mercaptosilane such as, for example, $HSC_3H_6Si(OCH_3)_3$.

In addition to the fluorinated silane of Formula (I), the hexafluoropropylene oxide derived silane coating composition can include an optional crosslinker. The crosslinker typically has two or more reactive silyl groups (i.e., a reactive silyl group is one that has at least one hydroxyl or hydrolyzable group). These silyl groups of the crosslinker can react with any reactive silyl group of the fluorinated silane that has not reacted with the siliceous substrate. Alternatively, a first group of the crosslinker can react with the siliceous substrate and a second group of the crosslinker can react with a reactive silyl group of the fluorinated silane. In this alternative reaction, the crosslinker can function as a linker between the fluorinated silane and the siliceous substrate.

Some crosslinkers have multiple reactive silyl groups. Some crosslinkers can be polymers with multiple silyl groups. One such polymer is poly(diethoxysilane). Other crosslinkers can be of Formula (XII) or Formula (XIII).

$$Si(R^3)_{4-y}(R^4)_y \quad (VII)$$

$$R^5\text{---}[Si(R^6)_{3-z}(R^7)_z]_2 \quad (VIII)$$

In Formula (VII) or (VIII), each $R^3$ or $R^6$ is independently hydroxyl or a hydrolyzable group and each $R^4$ or $R^7$ is independently a non-hydrolyzable group. The variable y in Formula (VII) is an integer in a range of 0 to 3 (i.e., 0, 1, 2, or 3). The variable z in Formula (VIII) is an integer in a range of 0 to 2 (i.e., 0, 1, or 2). The group $R^5$ in Formula (VIII) is an alkylene having 1 to 10 carbon atoms, 1 to 6 carbon atoms, 1 to 4 carbon atoms, or 1 to 3 carbon atoms. The alkylene $R^5$ can be linear, branched, cyclic, or a combination thereof.

Each $R^3$ or $R^6$ group in Formulas (VII) or (VIII) respectively is a hydroxyl or hydrolyzable group. This group can react with a remaining reactive silyl in a fluorinated silane. Reacting multiple such $R^3$ or $R^6$ groups with multiple fluorinated silanes can result in the crosslinking of the fluorinated silanes. Alternatively, one such group can also react with the surface of a siliceous substrate and another such group can react with a fluorinated silane to covalently attach the fluorinated silane to the siliceous substrate. Suitable hydrolyzable $R^3$ or $R^6$ groups include, for example, alkoxy, aryloxy, aralkyloxy, acyloxy, or halo groups.

Suitable alkoxy $R^3$ or $R^6$ groups are of formula —$OR^a$ where $R^a$ is an alkyl group having 1 to 10 carbon atoms, 1 to 6 carbon atoms, 1 to 4 carbon atoms, 1 to 3 carbon atoms, or 1 to 2 carbon atoms. The alkyl portion of the alkoxy group can be linear, branched, cyclic, or a combination thereof. In many embodiments of Formula (I), each $R^3$ or $R^6$ group is an alkoxy having 1 to 4 carbon atoms or 1 to 3 carbon atoms.

Suitable aryloxy $R^3$ or $R^6$ groups are of formula —OAr where Ar is an aryl group. The aryl group is monovalent group having at least one carbocyclic aromatic ring. Additional carbocyclic rings can be fused to the aromatic ring. Any additional rings can be unsaturated, partially saturated, or saturated. The aryl portion of the aryloxy group often has 6 to 12 carbon atoms or 6 to 10 carbon atoms. In many embodiments, the aryloxy group is phenoxy.

Suitable aralkyloxy $R^3$ or $R^6$ groups are of formula —$OR^b$—Ar. The group $R^b$ is a divalent alkylene group having 1 to 10 carbon atoms, 1 to 6 carbon atoms, or 1 to 4 carbon atoms and an aryl portion with 6 to 12 carbon atoms, or 6 to 10 carbon atoms. The alkylene can be linear, branched, cyclic, or a combination thereof. The group Ar is an aryl group having at least one carbocyclic aromatic ring. Additional carbocyclic rings can be fused to the aromatic ring. Any additional rings can be unsaturated, partially saturated, or saturated. The aryl group often has 6 to 12 carbon atoms or 6 to 10 carbon atoms. The aryl group is often phenyl.

Suitable acyloxy $R^3$ or $R^6$ groups are of formula —O(CO)$R^c$ where $R^c$ is alkyl, aryl, or aralkyl. The group (CO) denotes a carbonyl group. Suitable alkyl $R^c$ groups often have 1 to 10 carbon atoms, 1 to 6 carbon atoms, or 1 to 4 carbon atoms. The alkyl can be linear, branched, cyclic, or a combination thereof. Suitable aryl $R^c$ groups are carbocyclic and have at least one aromatic ring. Additional carbocyclic rings can be fused to the aromatic ring. Any additional rings can be unsaturated, partially saturated, or saturated. The aryl group often has 6 to 12 carbon atoms or 6 to 10 carbon atoms. The aryl group is often phenyl. Suitable aralkyl $R^c$ groups often have an alkylene group having 1 to 10 carbon atoms, 1 to 6 carbon atoms, or 1 to 4 carbon atoms and an aryl group with 6 to 12 carbon atoms, or 6 to 10 carbon atoms. The alkylene portion of the aralkyl group can be linear, branched, cyclic, or a combination thereof. The aryl portion of the aralkyl group has at least one carbocyclic aromatic ring. Additional carbocyclic rings can be fused to the aromatic ring. Any additional rings can be unsaturated, partially saturated, or saturated. The aryl group often has 6 to 12 carbon atoms or 6 to 10 carbon atoms. The aryl portion of the aralkyl group is often phenyl.

Suitable halo $R^3$ or $R^6$ groups include, but are not limited to: be bromo, iodo, or chloro groups. The halo is often chloro.

Each $R^4$ or $R^7$ group in Formulas (VII) or (VIII) respectively is a non-hydrolyzable group. Many non-hydrolyzable groups are alkyl, aryl, and aralkyl groups. Suitable alkyl $R^4$ or $R^7$ groups include those having 1 to 10 carbon atoms, 1 to 6 carbon atoms, or 1 to 4 carbon atoms. The alkyl can be linear, branched, cyclic, or a combination thereof. Suitable aryl $R^4$ or $R^7$ groups are carbocyclic and have at least one aromatic ring. Additional carbocyclic rings can be fused to the aromatic ring. Any additional rings can be unsaturated, partially saturated, or saturated. The aryl group often has 6 to 12 carbon atoms or 6 to 10 carbon atoms. The aryl group is often phenyl. Suitable aralkyl $R^4$ or $R^7$ groups often have an alkylene group having 1 to 10 carbon atoms, 1 to 6 carbon atoms, or 1 to 4 carbon atoms and an aryl group with 6 to 12 carbon atoms, or 6 to 10 carbon atoms. The alkylene portion of the aralkyl group can be linear, branched, cyclic, or a combination thereof. The aryl portion of the aralkyl group has at least one carbocyclic aromatic ring. Additional carbocyclic rings can be fused to the aromatic ring. Any additional rings can be unsaturated, partially saturated, or saturated. The aryl group often has 6 to 12 carbon atoms or 6 to 10 carbon atoms. The aryl portion of the aralkyl group is often phenyl.

Example crosslinkers include, but are not limited to, tetraalkoxysilanes such as tetraethoxysilane (TEOS) and bis(triethoxysilyl)ethane.

If included in the curable coating composition, the weight ratio of the crosslinker to the fluorinated silane (crosslinker:fluorinated silane) is often at least 0.5:100, at least 1:100, at least 2:100, or at least 5:100. The weight ratio can be up to 30:100, up to 20:100, or up to 10:100. For example, the weight ratio of crosslinker to fluorinated silane can be in a range of 0.5:100 to 30:100, in a range of 1:100 to 20:100, or in a range of 1:100 to 10:100.

Any of the coating compositions can include an optional solvent that is usually a fluorinated solvent. The fluorinated solvent is typically miscible with the fluorinated silane or with both the fluorinated silane and the fluorinated polyether oil. The fluorinated solvents may include, but are not limited to, perfluorinated hydrocarbons such as, for example, perfluorohexane, perfluoroheptane and perfluorooctane; fluorinated hydrocarbons such as, for example, pentafluorobutane, perfluorohexylethene ($C_6F_{13}CH=CH_2$), perfluorobutylethene ($C_4F_9CH=CH_2$), $C_4F_9CH_2CH_3$, $C_6F_{13}CH_2CH_3$, $C_6F_{13}H$, $C_2F_5CH=CHC_4F_9$, or 2,3-dihydrodecafluoropentane; hydrofluoroethers such as, for example, methyl perfluorobutyl ether, ethyl perfluorobutyl ether, $CF_3CH_2OCF_2CF_2H$, and $C_2F_5CF=CFCF(OC_2H_5)C_2F_5$; and combinations thereof. Some hydrofluoroethers are commercially available from 3M Company (Saint Paul, Minn.) under the trade designation 3M NOVEC™ ENGINEERED FLUID (e.g., 3M NOVEC™ ENGINEERED FLUID 7000, 7100, 7200, 7200DL, 7300, 7500, 71DE and 71DA).

The fluorinated solvent may contain small amounts of optional organic solvents which are miscible with the fluorinated solvent. For example, the solvent (i.e., fluorinated solvent plus optional organic solvent) can include up to about 10 weight percent, up to about 8 weight percent, up to about 6 weight percent, up to about 4 weight percent, up to about 2 weight percent, or up to about 1 weight percent organic solvent based on a total weight of solvent. Suitable organic solvents for combining with the fluorinated solvent include, but are not limited to, aliphatic alcohols such as, for example, methanol, ethanol, and isopropanol; ketones such as, for example, acetone and methyl ethyl ketone; esters such as, for example, ethyl acetate and methyl formate; ethers such as, for example, diethyl ether, diisopropyl ether, methyl t-butyl ether, and dipropylene glycol monomethyl ether (DPM); chlorinated hydrocarbons such as trans-dichloroethylene; alkanes such as, for example, heptane, decane, and other paraffinic (i.e., olefinic) organic solvents. Preferred organic solvents often include aliphatic alcohols such as ethanol and isopropanol.

If a solvent (i.e., a fluorinated solvent plus any optional organic solvent) is added to the coating composition, any suitable amount of the solvent can be used. Typically, the other components of the coating composition such as the fluorinated silane are dissolved in the solvent. The amount of solvent can also be selected to provide the desired viscosity for application of the curable coating composition to a siliceous substrate. Some example coating compositions contain up to about 50 weight percent, up to about 60 weight percent, up to about 70 weight percent, up to about 75 weight percent, up to about 80 weight percent, up to about 90 weight percent, up to about 95 weight percent, up to about 98 weight percent, or up to about 99.9 weight percent solvent. Some example curable coating compositions contain at least about 1 weight percent, at least about 5 weight percent, at least about 10 weight percent, at least about 15 weight percent, at least about 20 weight percent, at least about 25 weight percent, or at least about 30 weight percent solvent. For example, the curable coating compositions can include about 1 to about 99.9 weight percent, about 1 to about 95 weight percent, about 5 to about 90 weight percent, about 10 to about 90 weight percent, about 20 to about 90 weight percent, about 30 to 9 about 0 weight percent, about 40 to about 90 weight percent, about 50 to about 90 weight percent, about 50 to about 85 weight percent, or about 60 to about 85 weight percent solvent.

In some embodiments, the polymeric hexafluoropropylene oxide derived silane coating composition can be provided in the form of a concentrate that includes a fluorinated silane of Formula (I) and a fluorinated solvent. The concentrate contains up to about 99 weight percent, up to about 98 weight percent, up to about 95 weight percent, up to about 90 weight percent, up to about 85 weight percent, up to about 80 weight percent, up to about 75 weight percent, or up to about 70 weight percent fluorinated solvent based on a total weight of the concentrate.

In some embodiments, an optional moisture curing catalyst is included in the polymeric coating composition. Suitable moisture curing catalysts are those that are soluble in the polymeric coating composition (e.g., in the fluorinated solvent or in the combination of fluorinated solvent plus optional organic solvent) and can include, for example, ammonia, N-heterocyclic compounds, monoalkylamines, dialkylamines, or trialkylamines, organic or inorganic acids, metal carboxylates, metal acetylacetonate complexes, metal powders, peroxides, metal chlorides, organometallic compounds, and the like, and combinations thereof. When used, the moisture curing catalysts are used in amounts that are soluble in the curable coating compositions. In some embodiments, the moisture curing agents are present in an amount in a range of about 0.1 to about 10 weight percent, in a range of about 0.1 to about 5 weight percent, or in a range of about 0.1 to about 2 weight percent based on a total weight of the curable coating composition.

Example N-heterocyclic compounds that can function as moisture curing catalysts include, but are not limited to: 1-methylpiperazine, 1-methylpiperidine, 4,4'-trimethylenedipiperidine, 4,4'-trimethylene-bis(1-methylpiperidine), diazobicyclo[2.2.2]octane, cis-2,6-dimethylpiperazine, and the like, and combinations thereof. Example monoalkylamines, dialkylamines, and trialkylamines that can function as moisture curing catalysts include, but are not limited to, methylamine, dimethylamine, trimethylamine, phenylamine, diphenylamine, triphenylamine, DBU (that is, 1,8-diazabicyclo[5.4.0]-7-undecene), DBN (that is, 1,5-diazabicyclo[4.3.0]-5-nonene), 1,5,9-triazacyclododecane, 1,4,7-triazacyclononane, and the like, and combinations thereof. Example organic or inorganic acids that can function as moisture curing catalysts include, but are not limited to, acetic acid, formic acid, triflic acid, trifluoroacetic acid, perfluorobutyric acid, propionic acid, butyric acid, valeric acid, maleic acid, stearic acid, citric acid, hydrochloric acid, nitric acid, sulfuric acid, phosphoric acid, chloric acid, hypochlorous acid, and the like, and combinations thereof.

In another aspect, an article is provided that contains a) a siliceous substrate and b) a layer of a curable coating composition adjacent to the siliceous substrate. The polymeric coating compositions are any of those described herein.

Siliceous substrates include those formed of various materials that contain silicon distributed throughout the substrate. Examples of siliceous substrates include, but are not limited to: glass, ceramic materials, glazed ceramic materials, concrete, mortar, grout, and natural or man-made stone. The siliceous substrate can be, for example, part of an electronic display (e.g., an outer surface of an electronic display such as a touch screen), mirror, window, windshield, ceramic tile, shower stall, toilet, sink, or the like. In many embodiments, the siliceous substrate is transparent, which means that it is possible to see through the siliceous substrate with an unaided human eye. The transparent substrate can be clear or colored.

In yet another aspect, a method of making a fluorinated surface is provided. The method includes providing a siliceous substrate and disposing a coating composition adjacent to the siliceous substrate. Any coating composition described herein can be used. The method further includes reacting the coating composition with a surface of the siliceous substrate to form a coating composition. The coating composition on the siliceous substrate can provide, for example, abrasion resistant surfaces, easy to clean surfaces, surfaces with good tactile response (i.e., a finger can easily slide over the surface), or a combination thereof.

Coatings that include the hexafluoropropylene oxide derived silane polymer of the present invention may be applied to various substrates, particularly hard substrates, to render them oil-, water-, and soil repellent. The polymeric coating composition can be applied to the siliceous substrate using any suitable application method. In some embodiments, the polymeric coating compositions are applied using a vapor deposition method. In other embodiments, the coating compositions are applied using a technique such as spray coating, knife coating, dip coating, spin coating, meniscus coating, or the like.

Vapor deposition methods can be used alone or in combination with other application methods. In some embodiments, the hexafluoropropylene oxide derived silane polymer is vapor deposited on the siliceous substrate. The solution can be applied using various coating methods such as spray coating, knife coating, dip coating, spin coating, or meniscus coating as described below.

When vapor deposition is used for deposition of the hexafluoropropylene oxide derived silane polymer, the siliceous substrate is typically placed within a vacuum chamber. After the pressure has been reduced, the fluorinated silane is vaporized within the vacuum chamber. The hexafluoropropylene oxide derived silane polymer can be placed in a crucible or imbibed in a porous pellet that is heated within the vacuum chamber. The conditions used for vapor deposition depend on the molecular weight of the hexafluoropropylene oxide derived silane polymer. In some embodiments, the pressure during deposition is less than about $10^{-2}$ torr, less than about $10^{-3}$ torr, less than about $10^{-4}$ torr, or less than about $10^{-5}$ torr. If a fluorinated solvent is included in the coating composition, the fluorinated solvent is typically removed as the pressure within the vacuum chamber is lowered. The coating temperature is selected based on the boiling point of the materials that are deposited. Typically, a coating temperature at or above the boiling point but below the decomposition temperature is selected. Suitable temperatures are often at least about 100° C., at least about 150° C., at least about 200° C., or at least about 250° C.

When coating techniques such as spray coating, knife coating, dip coating, spin coating, or meniscus coating are used, the coating composition typically includes a fluorinated solvent. The percent solids of the coating composition are usually selected to provide a suitable solution viscosity for the particular application method and to dissolve the various components of the coating composition such as the fluorinated silane. In many application methods, the percent solids are no greater than about 50 weight percent, no greater than about 40 weight percent, no greater than about 30 weight percent, no greater than about 25 weight percent, no greater than about 20 weight percent, no greater than about 15 weight percent, no greater than about 10 weight percent, or no greater than about 5 weight percent. The percent solids are usually at least about 0.1 weight percent, at least about 1 weight percent, at least about 2 weight percent, or at least about 5 weight percent. The solids include the hexafluoropropylene oxide derived silane polymer and any other materials dissolved or suspended in the fluorinated solvent.

The polymeric coating composition is usually applied to the siliceous substrate at room temperature (in a range of about 15° C. to about 30° C. or in a range of about 20° C. to about 25° C.). Alternatively, the coating composition can be applied to the siliceous substrate that has been preheated at an elevated temperature such as, for example, in a range of about 40° C. to about 300° C., in a range of about 50° C. to about 200° C., or in a range of about 60° C. to about 150° C.

Suitable substrates that can be treated in with the perfluoropolyether silane coating composition include substrates having a hard surface preferably with functional groups capable of reacting with the hexafluoropropylene oxide derived silane polymer. Preferably, such reactivity of the surface of the substrate is provided by active hydrogen atoms. When such active hydrogen atoms are not present, the substrate may first be treated in a plasma containing oxygen or in a corona atmosphere to make it reactive.

Treatment of the substrates results in rendering the treated surfaces less retentive of soil and more readily cleanable due to the oil and water repellent nature of the treated surfaces. These desirable properties are maintained despite extended exposure or use and repeated cleanings because of the high degree of durability of the treated surface as can be obtained through the compositions of this invention.

The substrate may be cleaned prior to applying the compositions of the invention so as to obtain optimum characteristics, particularly durability. That is, the surface of the substrate to be coated should be substantially free of organic contamination prior to coating. Cleaning techniques depend on the type of substrate and include, for example, a solvent washing step with an organic solvent, such as acetone or ethanol.

In still another aspect, an article is provided that contains a) a siliceous substrate and b) a layer of a coating composition adjacent to the siliceous substrate. The coating composition includes a reaction product of a coating composition with a surface of the siliceous substrate. Any coating composition described herein can be used to form the coating composition.

As used herein, the term "curing" refers to the reaction of the silyl group of the hexafluoropropylene oxide derived silane polymer with the siliceous substrate. As used herein, the term "cured coating composition" refers to a coating composition that has undergone curing. The curing reaction results in the formation of a —Si—O—Si— group and the covalent attachment of the hexafluoropropylene oxide derived silane polymer to the siliceous substrate. In this siloxane group, one silicon atom is from the silyl group of the hexafluoropropylene oxide derived silane polymer and the other silicone atom is from the siliceous substrate.

Following application using any method, the polymeric coating composition can be dried to remove solvent and then cured at ambient temperature (for example, in the range of about 15° C. to about 30° C. or in the range of about 20° C. to about 25° C.) or at an elevated temperature (for example, in the range of about 40° C. to about 300° C., in the range of about 50° C. to about 250° C., in the range of about 50° C. to about 200° C., in the range of about 50° C. to about 175° C., in the range of about 50° C. to about 150° C., in the range of about 50° C. to about 125° C., or in the range of about 50° C. to about 100° C.) for a time sufficient for curing to take place. The sample is often held at the curing temperature for at least about 10 minutes, at least about 20 minutes, at least about 30 minutes, at least about 40 minutes, at least about 1 hour, at least about 2 hours, at least about 4 hours, or at least about 24 hours. The drying and curing steps can occur concurrently or separately by adjustment of the temperature.

Curing often occurs in the presence of some water. Sufficient water is often present to cause hydrolysis of the hydrolyzable groups described above, so that condensation to form —Si—O—Si— groups can occur (and thereby curing can be achieved). The water can be present in the atmosphere (for example, an atmosphere having a relative humidity of about 20 percent to about 70 percent), on the surface of the siliceous substrate, in the curable coating composition, or a combination thereof.

The cured coatings can have any desired thickness. This thickness is often in a range of about 2 to about 20 nanometers. For example, the thickness can be in a range about 2 to about 20, about 2 to about 10, or about 4 to about 10 nanometers.

The articles having a polymeric coating composition of the present invention often have improved abrasion resistance compared to the uncoated siliceous substrate. The coated siliceous substrate can be abraded with steel wool (e.g., steel wool No. 0000 that is capable of scratching a glass surface) while retaining water repellant and/or oil repellant properties of the cured coating. The coated siliceous substrate typically has a lower coefficient of friction compared to the uncoated siliceous substrate. This lower coefficient of friction may contribute to the improved abrasion resistance of the coated siliceous substrate.

The articles having a polymeric coating composition of the present invention provide a good tactile response. That is, a finger can slide over the surface of the articles easily. This is particularly desirable when the article is used in electronic displays such in touch screens.

The articles have an easy to clean surface. This easy to clean surface is provided by the use of fluorinated materials in the curable coating composition. The surfaces of the articles with cured coating compositions tend to be hydrophobic. The contact angle for water is often equal to at least about 85 degrees, at least about 90 degrees, at least about 95 degrees, at least about 100 degrees, at least about 105 degrees, at least about 110 degrees, or at least about 115 degrees.

In one embodiment, the article being coated with the composition of the present invention is a consumer electronic device. Consumer electronic devices includes, but is not limited to: personal computers (portable and desktop); tablet or slate style computing devices; handheld electronic and/or communication devices (e.g., smartphones, digital music players, multi-function devices, etc.); any device whose function includes the creation, storage or consumption of digital media; or any component or sub-component in any consumer electronic product.

Various items are provided that are curable coating compositions, articles that include the curable coating compositions, articles that include a cured coating composition, and method of making the articles with the cured coating composition.

EXAMPLES

Objects and advantages of this invention are further illustrated by the following examples, but the particular materials and amounts thereof recited in these examples, as well as other conditions and details, should not be construed to unduly limit this invention. These examples are for illustrative purposes only and are not meant to be limiting on the scope of the appended claims.

Materials

All solvents were standard reagent grade obtained from commercial sources and were used without further purification unless specified otherwise.

"Float glass plate" refers to a float glass pane that was obtained from Cardinal Glass Industries (Eden Prairie, Minn., USA). One side of the glass plate has a tin surface layer.

"Chemically strengthened glass plate" refers to alkali-aluminosilicate glass available from Corning Incorporated.

"HFPO" refers to hexafluoropropylene oxide.

"PF-5060DL™" refers to a fully fluorinated liquid that is commercially available from 3M Company (Saint Paul, Minn., USA) under trade designation 3M PERFORMANCE FLUID PF-5060DL™.

"NOVEC™ 7100" refers to a hydrofluoroether solvent that is commercially available from 3M Company (Saint Paul, Minn., USA) under trade designation 3M NOVEC™ ENGINEERED FLUID 7100. "NOVEC™ 7200DL" and "NOVEC™ 7200" refers to hydrofluoroether solvents that are commercially available from 3M Company (Saint Paul, Minn., USA) under trade designation 3M NOVEC™ ENGINEERED FLUID 7200DL and 3M NOVEC™ ENGINEERED FLUID 7200.

"NOVEC™ 7300" refers to a hydrofluoroether solvent that is commercially available from 3M Company (Saint Paul, Minn., USA) under trade designation 3M NOVEC™ ENGINEERED FLUID 7300.

Deposition Method

Two types of glass plates were used for testing: float glass or chemically strengthened glass. They will be referred to as "float glass" or "chemically strengthened glass" throughout the examples section.

When preparing float glass plate samples, the side of each glass plate substrate bearing the tin surface layer was identified using fluorescence under UV light and marked as the "back". Coatings according to the examples described below were deposited only on the front or air side of the glass plates (substrates).

When preparing chemically strengthened glass plate samples, both sides of the glass had the same composition and do not require identification of a "front" or "back" side.

Prior to use, all types of glass plate substrates were cleaned by one or more methods.

The first method included wetting the surface of glass with isopropyl alcohol (IPA) and wiping all surfaces including the edges of the glass plate using a soft woven cloth (commercially available from VWR North America (Batavia, Ill., USA) under the trade designation SPEC-WIPE 4 (catalog number 21912-046).

The second method included immersing the glass plate substrates for 10 minutes in a stirred mixture of 4 parts concentrated sulfuric acid and one part 30 percent hydrogen peroxide that was heated to approximately 100° C. Upon removal from the cleaning mixture, the glass plates were placed in a deionized water bath and then rinsed under a stream of deionized water. The glass plates were then dried under a stream of nitrogen and coated within approximately 30 minutes.

The third method included immersing the glass plate substrates for 10 minutes in a stirred mixture of 1 part 30% ammonium hydroxide, 2 parts 30 percent hydrogen peroxide and 20 parts deionized water. The mixture was heated to approximately 50° C. Upon removal from the cleaning mixture, the glass plates were placed in a deionized water bath and then rinsed under a stream of deionized water. The glass plates were then dried under a stream of nitrogen and coated within approximately 30 minutes.

The coatings were applied using a spray gun, which is commercially available as part number RG-3L-3S from Anest Iwata (Yokohama, Japan). Enough fluid was applied to completely coat the glass surface. After spray coating, the coated glass plates were cured in an oven heated to at least 135° C. for a time as specified in each example below. After curing, the coated glass plates were allowed to cool and rest for a minimum of 16 hours before any subsequent testing.

Method for Measuring Contact Angle

Coated substrates were prepared as described in the following examples using the deposition method as described above.

The coated substrates were wiped with a woven cloth (commercially available from VWR North America (Batavia, Ill., USA) under the trade designation SPEC-WIPE 4™ (catalog number 21912-046) that was moistened with isopropyl alcohol (IPA). The IPA was allowed to evaporate before measuring water ($H_2O$) and hexadecane (HD) contact angles (using water and hexadecane, respectively, as wetting liquids).

Measurements were made using as-received, reagent-grade hexadecane and filtered deionized water on a Kruss video contact angle analyzer that is available as product number DSA 100S from Kruss GmbH (Hamburg, Germany). Reported values are the averages of measurements on at least three drops. Drop volumes were 5 microliters for static water contact angle measurements and 4 microliters for static hexadecane contact angle measurements.

Method for Measuring Abrasion

A TABER 5900 linear abrader, which was obtained from Taber Industries of North Tonawanda (NY, USA), was used to conduct one of two abrasion test methods.

The first abrasion test method included using a 1 inch diameter round aluminum tool available from Taber Industries. Steel wool (No. 0000) was cut to a square approximately 1 inch by 1 inch and secured to the abrasion tool using double sided tape.

The second abrasion test method included using a 1 centimeter by 1 centimeter square tool available from Taber Industries. Steel wool (No. 0000 that is capable of scratching the surface of glass) was cut to approximately 20 millimeters by 40 millimeters in size, folded over once and placed between the square tool and the coated glass substrates to be tested. The grain of the steel wool was aligned such that the grain was parallel to the linear abrasion direction.

The samples were abraded in increments of at least 1,000 cycles at a rate of 60 cycles/minute (1 cycle consisted of a forward wipe followed by a backward wipe) with a force of either 2.5 Newtons (N) (using the first abrasion method above) or 10 Newtons (N) (using the second abrasion method above) and a stroke length of 70 millimeters. After each 1000 cycles (or as specified otherwise) of abrasion, the coated substrates were cleaned with IPA. Both water and hexadecane (HD) contact angle measurements made. The same coated substrate was cleaned again with IPA and subjected to another 1000 cycles (or as specified otherwise) of abrasion. A given set of samples was abraded using either the first or second abrasion method, they were not abraded with a combination of methods.

Method for Measuring Coefficient of Friction

The coefficient of friction (CoF) was measured on the coated glass substrates using a modification of the method described in ASTM D1894-08 (Standard Test Method for Static and Kinetic Coefficients of Friction of Plastic Film and Sheeting).

Measurements of CoF were obtained using an Extended Capability Slip/Peel Tester, model# SP-102B-3M-90 (Instrumentors, Inc., Strongsville, Ohio). This piece of equipment was located in a constant temperature and humidity test room maintained at 70 plus/minus 3° F. and 50 plus/minus 5% RH.

Pieces of float glass (5 in×10 in×0.125 in) were cleaned as described above using the first method followed by the second method. Cleaned substrates were then coated and cured as described above. Coated substrates were placed in the constant temperature and humidity test room and allowed to equilibrate for a minimum of 18 hours prior to testing.

Poron® ThinStick polyurethane foam, p/n 4790-92TS1-12020-04 from Rogers Corporation (Rogers, Conn.) was used as the material adhered to the sled (per the test method procedure), contacting the coated glass substrate. Pieces of the foam were cut into squares (2.5 in×2.5 in) and placed in the constant temperature and humidity test room and allowed to equilibrate for a minimum of 18 hours prior to testing.

The CoF was measured following the procedure specified in ASTM D1894-08. The coated substrate was adhered to the plane, coated side up, using double sided tape. The foam was adhered to the sled (foam side up) using double sided tape. The sled with foam attached was placed on the coated substrate and measured as described in the ASTM with the sled held stationary and the plane moving underneath at a rate of 12 inches per minute. The reported CoF data was based on the mean of at least 3 measurements made in succession using the same piece of foam and the same coated substrate. A new piece of foam was used for each coated substrate.

Preparation 1: Preparation of HFPO-Derived Methyl Ester

The methyl ester $F(CF(CF_3)CF_2O)_aCF(CF_3)C(O)OCH_3$, wherein the variable a has an average value in a range of 4 to 100, was prepared by metal fluoride-initiated oligomerization of hexafluoropropylene oxide in diglyme solvent according to the method described in U.S. Pat. No. 3,250,808 (Moore et al.), the description of which is incorporated herein by reference. The product was purified by distillation to remove low-boiling components. Several different number average molecular weight materials were prepared and converted to the corresponding allyl ethers following the chemistry described in the following preparative examples.

Other solvents could also be used in addition to those described in Moore et al. including hexafluoropropene, 1,1,1,3,3-pentafluorobutane and 1,3-bis(trifluoromethyl)benzene as described by S. V. Kostjuk et al. in *Macromolecules*, 42, 612-619 (2009).

Alternatively, the methyl ester could also be prepared as described below in Preparation 2 from the corresponding commercially available carboxylic acid.

Preparation 2: Preparation of HFPO-Derived Methyl Ester from HFPO-Derived Carboxylic Acid KRYTOX 157FS(H) (249.9 grams, 0.042 moles, $M_N$=5900, $C_3F_7O[CF(CF_3)CF_2O]_nCF(CF_3)CO_2H$, available from E. I. Du Pont de Nemours & Co. (Wilmington, Del., USA)) and dimethyl formamide (5.0 grams, 0.069 moles) were added to a 500 mL, three-necked round bottom flask equipped with an overhead stirrer and a water condenser topped with a nitrogen tee leading to a source of dry nitrogen and a scrubber containing a dilute solution of aqueous potassium carbonate. The mixture was heated to 75° C. and then thionyl chloride (10.1 grams, 0.085 moles, obtained from Aldrich Chemical Company, Milwaukee, Wis.) was added by pipette through the third neck of the flask. (An equivalent amount of oxalyl chloride could be substituted for the thionyl chloride with the reaction run at 65° C.). Gas evolution was observed and the reaction was stirred for an additional 16 hours at 75° C. The product was HFPO-derived carboxylic acid chloride.

At the end of this time, methanol (25 mL) was added to the reaction mixture to convert the HFPO-derived carboxylic acid chloride to the methyl ester. The reaction mixture was stirred for an additional hour at 75° C. After the mixture had cooled, the resulting two phase system was separated. The lower product phase was dissolved in PF-5060DL (200 mL) and washed once with acetone (25 mL). The solution was filtered through a DRYDISK Separation Membrane with a GORE-TEX process filtration media that is available from Horizon Technology, Inc. (Salem, N.H., USA). The solvent was removed by rotary evaporation to afford $C_3F_7O[CF(CF_3)CF_2O]_nCF(CF_3)CO_2CH_3$ with a yield in excess of 98 percent.

Preparation 3: Preparation of HFPO-Derived Alcohol from HFPO-Derived Methyl Ester The HFPO-derived methyl ester $C_3F_7O[CF(CF_3)CF_2O]_nCF(CF_3)CO_2CH_3$ ($M_N$=5900, 195.5 grams, 0.033 moles), NOVEC™ 7100 (293 grams) and tetrahydrofuran (60 grams) were placed within a 1 L, three-necked round bottom flask equipped with an overhead stirrer. The solution was cooled in an ice bath to about 3° C. Sodium borohydride (5.16 grams, 0.136 moles), which was obtained from Aldrich Chemical Company (Milwaukee, Wis., USA), was added to the solution. When the temperature had reached 1° C., anhydrous methanol (4.4 grams) was added.

Three more additions of methanol (approximately 4.4 grams each) were subsequently added at about one hour intervals and the reaction mixture was then allowed to warm to room temperature over about 16 hours after the addition of the last methanol charge. The reaction mixture was then cooled in an ice bath to about 1° C. and additional methanol (17.5 grams) was added. The mixture was stirred for 30 minutes and then allowed to warm to room temperature. NOVEC™ 7100 (101 grams) and glacial acetic acid (2.1 grams) were then added to give a mixture having a pH in a range of 6 to 9. Additional acetic acid was added until the pH reached about 5 for a total of 33 grams. Deionized water (200 mL) was then added and the contents of the flask transferred to a separatory funnel. The lower phase was removed and washed with 200 mL water. The lower organic phase was separated, dried over magnesium sulfate, and filtered. The solvent was removed by rotary evaporation to obtain 193 grams of the product alcohol $C_3F_7O[CF(CF_3)CF_2O]_nCF(CF_3)CH_2OH$ in high purity.

Preparation 4: Preparation of HFPO-Derived Allyl Ether from HFPO-Derived Alcohol The HFPO-derived alcohol $C_3F_7O[CF(CF_3)CF_2O]_nCF(CF_3)CH_2OH$ ($M_N$=5900, 181 grams, 0.031 moles) and NOVEC™ 7200 (360 grams) were placed in a 1 L, three-necked round bottom flask equipped with an overhead stirrer. A solution of potassium hydroxide (4.33 grams, 0.066 moles) in deionized water (7 grams) and tetrabutylammonium bromide (2 grams) were added. The reaction mixture was heated to 63° C. for 30 minutes. Allyl bromide (9.3 grams, 0.076 moles) was then added and the reaction mixture held at 63° C. for about 16 hours. The cooled reaction mixture was then transferred to a separatory funnel and the aqueous phase was separated and discarded. The organic phase was washed with 250 mL of approximately 2N aqueous hydrochloric acid and then with 50 mL of saturated aqueous sodium chloride solution. The lower organic phase was then separated, dried over magnesium sulfate and filtered. Silica gel (15 grams) was then added, the solution agitated briefly, and the silica gel removed by filtration. The solvent was removed by rotary evaporation under vacuum (60° C., 1.3 kPa (10 torr)) to obtain 173 grams of the allyl ether product $C_3F_7O[CF(CF_3)CF_2O]_n$ $CF(CF_3)CH_2OCH_2CH=CH_2$ in about 94 weight percent purity which still contained some of the starting material alcohol.

The reaction was repeated with the following changes: 173 grams of the HFPO-derived allyl ether product of 94 percent purity (containing 6 percent of the HFPO-derived alcohol starting material) from the reaction above, NOVEC™ 7200 (347 grams), potassium hydroxide (9.8 grams, 0.149 moles) in deionized water (12.5 grams), tetrabutylammonium bromide (4 grams) and allyl bromide (23.9 grams, 0.195 moles). The reaction was held at 45° C. for 16 hours. The reaction mixture was decanted from a crystalline solid and placed in a separatory funnel. The aqueous layer and a small amount of an upper oily layer removed. The solvent and any excess volatile reagents were removed by rotary evaporation at reduced pressure and the mixture held at 90° C., 10 torr for one hour. The mixture was redissolved in NOVEC™ 7200 (500 mL) and filtered. Silica gel (25 grams) was added and the mixture stirred for 30 minutes. The silica gel was removed by filtration and the solvent removed by rotary evaporation at 65° C., 1.3 kPa (10 torr) to obtain 173 grams of the HFPO-derived allyl ether product that contained no HFPO-derived alcohol starting material.

Comparative Sample A1: Preparation of HFPO-Derived Thioether Silane ($M_N$=1450)

HFPO-derived thioether silanes were prepared substantially according to the methods described in U.S. Pat. No. 7,294,731 (Flynn et al.), the description of which is incorporated herein by reference. The preparation of the HFPO-derived thioether silane with a number average molecular weight equal to 1450 grams/mole was as follows.

$C_3F_7O[CF(CF_3)CF_2O]_nCF(CF_3)CH_2OCH_2CH=CH_2$, (40 grams, 0.028 mole, $M_n$=1250), $HSC_3H_6Si(OCH_3)_3$ (11.1 grams, 0.056 moles, obtained from Alfa Aesar (Ward Hill, Mass., USA)), ethyl acetate (65 mL), NOVEC™ 7100 (65 mL) and 2,2'-azobis(2-methylpropionitrile) (0.13 grams, obtained from E. I. Du Pont de Nemours & Co. (Wilmington, Del., USA) under the trade designation VAZO 64) were combined in a 250 mL round bottom flask equipped with a thermocouple temperature probe, magnetic stir bar and a water filled condenser under a nitrogen atmosphere. The atmosphere in the reaction vessel was then exchanged four times with dry nitrogen using a Firestone valve connected to a water aspirator and a source of dry nitrogen. The reaction mixture was heated to 70° C. and held at that temperature for 16 hours. The solvent was removed by rotary evaporation. Excess silane was removed by distillation (200 mTorr, 40° C.) and PF-5060DL (300 mL) subsequently added. This solution was then washed with acetone (150 mL). The lower fluorochemical phase was separated and the PF-5060DL was removed by rotary evaporation to give 39 grams of the HFPO-derived thioether silane.

Comparative Sample A2: Preparation of HFPO-Derived Thioether Silane ($M_N$=3300)

The preparation of the HFPO-derived thioether silane with a number average molecular weight equal to 3300 grams/mole was as follows.

$C_3F_7O[CF(CF_3)CF_2O]_nCF(CF_3)CH_2OCH_2CH=CH_2$, (15.7 grams, 0.0051 mole, $M_n$=3100), $HSC_3H_6Si(OCH_3)_3$ (4.0 grams, 0.02 moles), ethyl acetate (45 grams), NOVEC™ 7100 (45 grams) and 2,2'-azobis(2-methylpropionitrile) (0.1 grams) were combined in a 250 mL round bottom flask equipped with a thermocouple temperature probe, magnetic stir bar and a water filled condenser under a nitrogen atmosphere. The atmosphere in the reaction vessel was then exchanged four times with dry nitrogen using a Firestone valve connected to a water aspirator and a source of dry nitrogen. The reaction mixture was heated to 63° C. and held at that temperature for 64 hours during which time the reaction became completely homogeneous. The solvents were removed by rotary evaporation and PF-5060DL (350 mL) added. This solution was then washed with acetone (150 mL). The lower fluorochemical phase was separated and subsequently the PF-5060DL was removed by rotary evaporation to give 12.6 grams of the HFPO-derived thioether silane.

Sample A3: Preparation of HFPO-Derived Thioether Silane ($M_N$=5860)

The preparation of the HFPO-derived thioether silane with a number average molecular weight equal to 5860 grams/mole was as follows.

$C_3F_7O[CF(CF_3)CF_2O]_nCF(CF_3)CH_2OCH_2CH=CH_2$, (24.9 grams, 0.0044 mole, $M_n$=5665), $HSC_3H_6Si(OCH_3)_3$ (3.4 grams, 0.018 moles), ethyl acetate (20 grams), NOVEC™ 7200 (80 grams) and 2,2'-azobis(2-methylpropionitrile) (0.3 grams) were combined in a 250 mL round bottom flask equipped with a thermocouple temperature probe, magnetic stir bar and a water filled condenser under a nitrogen atmosphere. The atmosphere in the reaction vessel was then exchanged four times with dry nitrogen using a Firestone valve connected to a water aspirator and a source of dry nitrogen. The reaction mixture was heated to 65° C. and held at that temperature for 16 hours during which time the reaction became completely homogeneous. The solvent was removed by rotary evaporation and PF-5060DL (300 mL) added. This solution was then washed with acetone (150 mL). The lower fluorochemical phase was separated and subsequently the PF-5060DL was removed by rotary evaporation to give 23.7 grams of the HFPO-derived thioether silane. There was still some allyl ether starting material remaining in this reaction so the reaction mixture was dissolved in NOVEC™ 7200 (100 mL) and treated with $HSC_3H_6Si(OCH_3)_3$ (10.0 grams, 0.051 moles) and 2,2'-azobis(2-methylpropionitrile) (0.7 grams) and, after sparging with nitrogen as above, heated to 65° C. and held at that temperature for 16 hours followed by an identical workup to yield the final silane product in which the allyl ether was completely consumed.

Comparative Sample B1: Preparation of HFPO-Derived Ether Silane ($M_N$=2420)

The HFPO-derived allyl ether $C_3F_7O[CF(CF_3)CF_2O]_nCF(CF_3)CH_2OCH_2CH=CH_2$ ($M_N$=2300, 25 grams, 0.0109 moles, prepared substantially as described above for the $M_N$=5900 allyl ether) and 1,3-bis(trifluoromethyl)benzene (50 mL, obtained from TCI America (Portland Oreg., USA)) were placed into a 100 mL round bottom flask equipped with a thermocouple and condenser topped with a glass tee leading to a source of dry nitrogen and a mineral oil bubbler. The reaction solution was then heated to 60° C. and trichlorosilane (6.68 grams, 0.049 moles, obtained from Alfa Aesar (Ward Hill, Mass., USA)) added. Then, platinum(0)-1,3-divinyl-1, 1,3,3-tetramethyldisiloxane complex, solution in xylenes (0.15 grams of approximately 2 weight percent Pt, obtained from Aldrich Chemical Company (Milwaukee, Wis., USA)) was added to the solution held at 60° C. in three increments of about 0.05 grams each over a period of two hours. The solution was held at 60° C. for an additional two hours. The homogeneous solution was then cooled to room temperature and the excess silane removed under vacuum. To the remaining mixture was then added a solution of trimethyl orthoformate (14.2 grams, 0.134 mol, obtained from Alfa Aesar (Ward Hill, Mass., USA)) and methanol (0.5 grams). The mixture was heated to 60° C. for sixteen hours. An additional 15 grams of methanol was added and the mixture heated to 60° C. for 45 minutes. The warm solution was transferred to a separatory funnel and cooled to room temperature. The lower phase was separated and the small amount of solvent remaining in the silane was removed by rotary evaporation at reduced pressure (50° C., 2 kPa (15 torr)) to give 20.3 grams of clear HFPO-derived ether silane ($M_N$=2420) $C_3F_7O[CF(CF_3)CF_2O]_nCF(CF_3)CH_2OCH_2CH_2CH_2Si(OMe)_3$.

Sample B2: Preparation of HFPO-Derived Ether Silane ($M_N$=5711)

The HFPO-derived allyl ether prepared as described above $C_3F_7O[CF(CF_3)CF_2O]_nCF(CF_3)CH_2OCH_2CH=CH_2$ ($M_N$=5588, 20.4 grams, 0.0037 moles) and 1,3-bis(trifluoromethyl)benzene (50 mL) were placed into a 100 mL round bottom flask equipped with a thermocouple and condenser topped with a glass tee leading to a source of dry nitrogen and a mineral oil bubbler. The reaction solution was then heated to 60° C. and trichlorosilane (5.6 grams, 0.041 moles) added. Then, platinum(0)-1,3-divinyl-1,1,3,3-tetramethyldisiloxane complex, solution in xylenes (0.15 grams of approximately 2 weight percent Pt) was added to the solution in three increments of about 0.05 grams each over a period of three hours. The solution was held at 60° C. for an additional three hours. The homogeneous solution was then cooled to room temperature and the excess silane removed under vacuum. To the remaining mixture was then added a solution of trimethyl orthoformate (10.0 grams, 0.094 moles) and methanol (0.5 grams). The mixture was heated to 60° C. for sixteen hours. An additional 10 grams of methanol was added and the mixture heated to 60° C. for 45 minutes. The warm solution was transferred to a separatory funnel and cooled to room temperature. The lower phase was separated and the small amount of solvent remaining in the silane was removed by rotary evaporation at reduced pressure (50° C., 2 kPa (15 torr)) to give 16.8 grams of clear HFPO-derived ether silane ($M_N$=5711) $C_3F_7O[CF(CF_3)CF_2O]_nCF(CF_3)CH_2OCH_2CH_2CH_2Si(OMe)_3$.

Sample C1: Preparation of HFPO-Derived Ether Silane ($M_N$=7124)

The HFPO-derived allyl ether prepared as described above $C_3F_7O[CF(CF_3)CF_2O]_nCF(CF_3)CH_2OCH_2CH=CH_2$ ($M_N$=7002, 43.4 grams, 0.0062 moles) and 1,4-bis(trifluoromethyl)benzene (164 grams, which can be purchased from Alfa Aesar) were placed into a 500 mL round bottom flask equipped with a thermocouple and condenser topped with a glass tee leading to a source of dry nitrogen and a mineral oil bubbler. Trichlorosilane (11.7 grams, 0.086 moles) was added and the reaction solution was then heated to 60° C. Then, platinum(0)-1,3-divinyl-1,1,3,3-tetramethyldisiloxane complex, solution in xylenes (about 0.4 grams of approximately 2 weight percent Pt) was added to the solution and the solution was held at 60° C. for 16 hours. The homogeneous solution was then cooled to room temperature and the excess silane removed under vacuum. To the remaining mixture was then added trimethyl orthoformate (9.1 grams, 0.085 moles) and the mixture was heated to 60° C. for sixteen hours. The solution was transferred to a separatory funnel and methanol (200 mL) added. The lower phase was separated and the small amount of solvent remaining in the silane was removed by rotary evaporation at reduced pressure (50° C., 2 kPa (15 torr)) to give 43.6 grams of clear HFPO-derived ether silane ($M_N$=7124) $C_3F_7O[CF(CF_3)CF_2O]_nCF(CF_3)CH_2OCH_2CH_2CH_2Si(OMe)_3$.

Sample C2: Preparation of HFPO-Derived Ether Silane ($M_N$=14634)

The HFPO-derived allyl ether prepared as described above $C_3F_7O[CF(CF_3)CF_2O]_nCF(CF_3)CH_2OCH_2CH=CH_2$ ($M_N$=14500, 37.3 grams, 0.0026 moles) and 1,4-bis(trifluoromethyl)benzene (166 grams) were placed into a 500 mL round bottom flask equipped with a thermocouple and condenser topped with a glass tee leading to a source of dry nitrogen and a mineral oil bubbler. Trichlorosilane (6.76 grams, 0.049 moles) was added and the reaction solution was then heated to 60° C. Then, platinum(0)-1,3-divinyl-1,1,3,3-tetramethyldisiloxane complex, solution in xylenes (about 0.4 grams of approximately 2 weight percent Pt) was added to the solution and the solution was held at 60° C. for 16 hours. The homogeneous solution was then cooled to room temperature and the excess silane removed under vacuum. To the remaining mixture was then added trimethyl orthoformate (5.3 grams, 0.05 moles) and the mixture was heated to 60° C. for sixteen hours. The solution was transferred to a separatory funnel and methanol (200 mL) added. The lower phase was separated and washed two times with methanol (50 mL), the residue taken up in NOVEC™ 7200 and the solvents removed by rotary evaporation at reduced pressure (50° C., 2 kPa (15 torr)) to give 37 grams of clear HFPO-derived ether silane ($M_N$=14634) $C_3F_7O[CF(CF_3)CF_2O]_nCF(CF_3)CH_2OCH_2CH_2CH_2Si(OMe)_3$.

Example 1

Comparative Samples A1 and A2 and Sample A3

All samples described below were coated on float glass substrates that were cleaned, cured and tested according to the methods described above (deposition method) unless otherwise noted. Samples were cleaned according to the second method described above.

For Comparative Sample A1 (CS A1), a cleaned float glass plate substrate was spray-coated with a solution of 2.5 grams of a 20 weight percent solution of HFPO-derived thioether silane (MW 1450) in NOVEC™ 7200 diluted to a total weight of 20 grams with NOVEC™ 7300.

For Comparative Sample A2 (CS A2), a cleaned float glass plate substrate was spray-coated with a solution of 2.5 grams of a 20 weight percent solution of HFPO-derived thioether silane (MW 3300) in NOVEC™ 7200 diluted to a total weight of 20 grams with NOVEC™ 7300.

For Sample A3, a cleaned float glass plate substrate was spray-coated with a solution of 2.5 grams of a 20 weight percent solution of HFPO-derived thioether silane (MW 5860) in NOVEC™ 7200 diluted to a total weight of 20 grams with NOVEC™ 7300.

All samples of Comparative Samples A1 and A2 and Sample A3 were cured at 135° C. for 10 minutes. After resting, the samples were cleaned and initial contact angle measurements were performed. The samples were then abraded according to the first abrasion test method described above. Contact angle measurements were performed after each 1000 cycles of abrasion testing as described above. The test results are summarized in Table 1 below.

TABLE 1

| | $H_2O$ Contact Angle (Degrees) after Abrasion Cycles | | | | |
|---|---|---|---|---|---|
| | 0 | 2500 | 5000 | 7500 | 10000 |
| CS A1 | 111.1 | 108.5 | 99.7 | 96.8 | 80.5 |
| CS A2 | 115.1 | 114.4 | 110.4 | 103 | 79.6 |
| A3 | 115.7 | 114.7 | 110.3 | 107.6 | 90.3 |

TABLE 1-continued

| | HD Contact Angle (Degrees) after Abrasion Cycles | | | | |
|---|---|---|---|---|---|
| | 0 | 2500 | 5000 | 7500 | 10000 |
| CS A1 | 74.5 | 70.6 | 68 | 58.7 | 46.3 |
| CS A2 | 69.4 | 74.6 | 74.9 | 67.3 | 62.5 |
| A3 | 68.1 | 71.6 | 70.7 | 68.7 | 69.4 |

Table 1 shows that upon completion of 10,000 cycles, the water and HD contact angles for Comparative Sample A1 and A2 dropped significantly compared to those values for Sample A3 which were maintained most of the coating performance at the completion of the test.

Example 2

Comparative Sample B1 and Sample B2

All samples described below were coated on float glass substrates that were cleaned, cured and tested according the methods described above (deposition method) unless otherwise noted. Samples were cleaned according to the second method as described above.

For Comparative Sample B1 (CS B1), a cleaned float glass plate substrate was spray-coated with a solution of 2.5 grams of a 20 weight percent solution of HFPO-derived ether silane (MW 2420) in NOVEC™ 7200 diluted to a total weight of 20 grams using NOVEC™ 7300.

For Sample B2, a cleaned float glass plate substrate was spray-coated with a solution of 2.5 grams of a 20 weight percent solution of HFPO-derived ether silane (MW 5711) in NOVEC™ 7200 diluted to a total weight of 20 grams with NOVEC™ 7300.

All samples were cured at 185° C. for 60 minutes. After resting, the samples were cleaned and initial contact angle measurements were performed. The samples were then abraded according to abrasion test method two as described above. Contact angle measurements were performed after each 1000 cycles of abrasion testing as described above. The test results are summarized in Table 2 below.

TABLE 2

| | $H_2O$ Contact Angle (Degrees) after Abrasion Cycles | | | |
|---|---|---|---|---|
| | 0 | 1000 | 2000 | 3000 |
| CS B1 | 116.2 | 114.5 | 45.0 | 45.0 |
| B2 | 117.3 | 113.8 | 111.3 | 103.7 |

| | HD Contact Angle (Degrees) after Abrasion Cycles | | | |
|---|---|---|---|---|
| | 0 | 1000 | 2000 | 3000 |
| CS B1 | 73.0 | 71.0 | 15.0 | 15.0 |
| B2 | 73.1 | 72.0 | 68.5 | 68.4 |

Table 2 shows that at the completion of 2000 cycles, CS B1 had complete failure of the coating represented by the water contact angle of 45 degrees and the HD contact angle of 15 degrees. These values are consistent with contact angles on uncoated glass. After 3000 cycles, B2 showed a minimal drop in contact angle.

Example 3

Samples C1 and C2

All samples described below were coated on chemically strengthened glass substrates that were cleaned, cured and tested according the methods described above (liquid deposition) unless otherwise noted. Samples were cleaned according to method 1 followed by method 3 as described above.

For Sample C1, a cleaned chemically strengthened glass plate substrate was spray-coated with a solution of 2.5 grams of a 20 weight percent solution of HFPO-derived ether silane (MW 7124) in NOVEC™ 7200 diluted to a total weight of 20 grams using NOVEC™ 7300.

For Sample C2, a cleaned chemically strengthened glass plate substrate was spray-coated with a solution of 2.5 grams of a 20 weight percent solution of HFPO-derived ether silane (MW 14634) in NOVEC™ 7200 diluted to a total weight of 20 grams with NOVEC™ 7300.

All samples of C1 and C2 were cured at 185° C. for over 60 minutes. After resting, the samples were cleaned and initial contact angle measurements were performed. The samples were then abraded according to abrasion test method two as described above. Contact angle measurements were performed after the first 2000 cycles and then after completing 3000 cycles of abrasion testing as described above. The test results are summarized in Table 3 below.

TABLE 3

| | $H_2O$ Contact Angle (Degrees) after Abrasion Cycles | | |
|---|---|---|---|
| | 0 | 2000 | 3000 |
| C1 | 118.8 | 105.2 | 98.7 |
| C2 | 116.0 | 113.1 | 107.0 |

| | HD Contact Angle (Degrees) after Abrasion Cycles | | |
|---|---|---|---|
| | 0 | 2000 | 3000 |
| C1 | 72.1 | 66.6 | 63.6 |
| C2 | 77.8 | 71.8 | 70.1 |

Table 3 shows at the completion of 3000 cycles, both Samples C1 and C2 had minimal drops in the water contact angle and the HD contact angles. Table 3 also shows that increased molecular weight resulted in improved coating durability.

Example 4

Comparative Samples 4A and 4B and sample 4C

All samples described below were coated on cleaned float glass substrates, cured and tested according the methods described above (liquid deposition) unless otherwise noted.

Comparative Sample 4A (CS 4A) was uncoated float glass.

Comparative Sample 4B (CS 4B) was coated with a solution of 2.5 grams of a 20 weight percent solution of HFPO-derived ether silane (MW 2420) in NOVEC™ 7200 diluted to a total weight of 20 grams with NOVEC™ 7300.

Sample 4C was coated with a solution of 2.5 grams of a 20 weight percent solution of HFPO-derived ether silane (MW 5711) in NOVEC™ 7200 diluted to a total weight of 20 grams with NOVEC™ 7300.

Sample 4D was coated with a solution of 2.5 grams of a 20 weight percent solution of HFPO-derived ether silane (MW 7112) in NOVEC™ 7200 diluted to a total weight of 20 grams with NOVEC™ 7300.

The coated glass substrates of Comparative Sample 4B and Samples 4C and 4D were then cured at 185° C. for 60 minutes. After cooling for 30 minutes, the coated glass substrates were placed in a controlled temperature and humidity room to age for 3 days. The coefficient of friction was measured and reported in Table 4.

TABLE 4

| | CoF (unitless) |
|---|---|
| CS 4A | 0.55 |
| CS 4B | 0.35 |
| 4C | 0.30 |
| 4D | 0.28 |

Table 4 shows that the coefficient of friction was altered by applying coatings with different molecular weights. Uncoated float glass had the highest CoF while coated float glass had a lower (and more desirable) CoF. A suitable CoF on float glass is less than about 0.35.

Although the present invention has been described with reference to particular embodiments, those of skill in the art will recognize that changes may be made in form and detail without departing from the spirit and scope of the invention.

The invention claimed is:

1. A polymeric coating for a glass substrate comprising:
a hexafluoropropylene oxide derived silane polymer having the following formula:

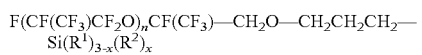
$F(CF(CF_3)CF_2O)_nCF(CF_3)-CH_2O-CH_2CH_2CH_2-Si(R^1)_{3-x}(R^2)_x$ where $R^1$ is hydroxy or a hydrolyzable group, $R^2$ is a non-hydrolyzable group, x is 0, 1, or 2, and n is an integer in a range of about 4 to about 150;
wherein the hexafluoropropylene oxide derived silane polymer has a molecular weight of greater than about 5500;
wherein a water contact angle of the polymeric hexafluoropropylene oxide derived silane coating decreases by less than about 27% after 10000 abrasion cycles;
wherein the polymeric hexafluoropropylene oxide derived silane coating has a thickness of between about 2 and about 15 nanometers; and
wherein the polymeric hexafluoropropylene oxide derived silane coating has a coefficient of friction constant of less than about 0.35.

2. The polymeric coating of claim 1, wherein the water contact angle of the polymeric hexafluoropropylene oxide derived silane coating decreases by less than about 25% after 10000 abrasion cycles.

3. The polymeric coating of claim 1, wherein a hexadecane contact angle of the polymeric hexafluoropropylene oxide derived silane coating decreases by less than about 8% after 10000 abrasion cycles.

4. The polymeric coating of claim 3, wherein a hexadecane contact angle of the polymeric hexafluoropropylene oxide derived silane coating decreases by less than about 6% after 10000 abrasion cycles.

5. The polymeric coating of claim 1, wherein the polymeric hexafluoropropylene oxide derived silane coating has a coefficient of friction constant of less than about 0.32.

6. The polymeric coating of claim 1, wherein the molecular weight of the polymeric hexafluoropropylene oxide derived silane coating is based on a single molecular weight.

7. The polymeric coating of claim 1, wherein the molecular weight of the polymeric hexafluoropropylene oxide derived silane coating is based on more than one molecular weight.

8. The polymeric coating of claim 1, wherein the polymeric coating is disposed on a consumer electronic device.

* * * * *